April 27, 1965
C. E. HUCKINS
3,181,008
AMPLITUDE SENSITIVE PEAK SIGNAL SELECTOR
WITH COMPENSATING MEANS
Filed Oct. 15, 1962
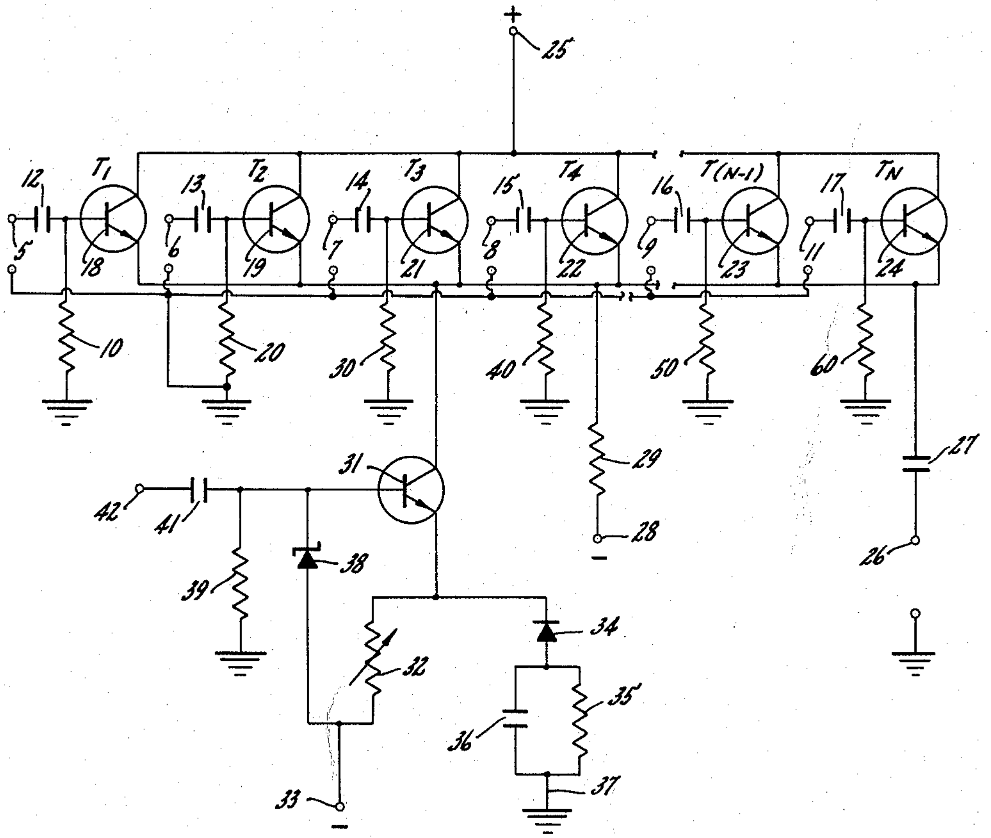
INVENTOR.
Charles E. Huckins,
BY
H. H. Losche
Att'ys.

United States Patent Office 3,181,008
Patented Apr. 27, 1965

3,181,008

AMPLITUDE SENSITIVE PEAK SIGNAL SELECTOR WITH COMPENSATING MEANS

Charles E. Huckins, Baltimore, Md., assignor, by mesne assignments, to the United States of America as represented by the Secretary of the Navy Filed Oct. 15, 1962, Ser. No. 230,767
1 Claim. (Cl. 307—88.5)

The present invention relates to signal selection circuitry and more particularly to a device for selecting the signal having the greatest amplitude from a group of input signals and permitting only that signal to pass to an output means.

Often it becomes desirable not only to select the signal having the greatest amplitude from a group of signals, but also to preserve and present to an output means the true amplitude of that selected signal throughout the selection process, because this true amplitude may need to be continuously utilized in subsequent circuitry. The present invention performs this important function through the use of novel selection current switching circuitry.

Some devices of the prior art have provided means for indicating which of a group of input signals has the greater amplitude at any given time, but these devices provide merely an indication and not necessarily the true amplitude of the selected signal. Many applications of selection circuitry, both military and commercial, require that for such a selection device to be useful, it must provide not merely an indication of which of a group of input signals has the greatest amplitude but must in fact present the true amplitude of that input signal to subsequent circuitry for utilization purposes. A need exists for such a device and the present invention is capable of satisfying this need.

An object of the present invention is the provision of a device for selecting from a group of input signals the one signal having the greatest amplitude and providing an indication of that particular signal to an output means.

Another object is to provide a device for selecting the signal of greatest amplitude from a group of input signals and continuously providing the true amplitude of this selected signal to an output means for further utilization.

A further object of the invention is the provision of a transistor peak selection circuit which selects the strongest signal from several input signals and permits only that signal to pass to an output means and provides any compensation necessary to maintain that output signal at the true amplitude of the selected input signal.

Other objects and features of the invention will become apparent to those skilled in the art as the disclosure is revealed in the following detailed description of a preferred embodiment of the invention as schematically illustrated in a single figure on the accompanying sheet of drawing.

Referring now to the figure of drawing, there is shown a specific embodiment of the invention in which the individual input terminal means 5, 6, 7, 8, 9, and 11 are coupled via input capacitance means 12, 13, 14, 15, 16, and 17, respectively, to the base electrodes of matched input transistor control means 18, 19, 21, 22, 23, and 24, $T_1$ through $T_N$, which base electrodes are also coupled via equal biasing resistances 10, 20, 30, 40, 50, and 60, respectively, to ground potential. These input transistor control means also have their collector electrodes coupled in common to a source of positive direct current potential 25 and their emitter electrodes coupled in common to an output terminal means 26 via a direct current blocking capacitance 27, and to a source of negative direct current potential 28 via a fixed resistance 29, source 28 and resistance 29 providing a fixed current source for all input transistor control means. Transistor switch means 31 has its collector electrode coupled in common with the emitter electrodes of all input transistor control means, and its emitter electrode coupled to an adjustable current source composed of adjustable resistance 32, source of negative direct current potential 33, protective diode 34, resistance 35, and a capacitance 36. These elements cooperate to produce a constant potential at the emitter electrode of transistor switch means 31 as a result of a current flow from ground potential 37 via resistance 35, diode 34, and adjustable resistance 32 to negative direct current potential source 33. The base electrode of transistor switch means 31 is coupled via a voltage regulating Zener diode 38 to source 33 and via resistance 39 to ground, diode 38 and resistance 39 providing a constant potential thereon (positive with respect to its emitter electrode) to maintain transistor switch means 31 in a state of conduction in the absence of a negative gating signal at terminal 42, which is coupled to the base electrode thereof via coupling capacitance 41.

*Operation*

The invention selects the one signal having the greatest amplitude from a group of signals which are individually applied to input transistors $T_1$ through $T_N$, respectively, via input terminal means 5, 6, 7, 8, 9, and 11, and supplies this selected signal to output terminal means 26 while maintaining it at its true input voltage level. In order to maintain the true amplitude of this signal and not have that amplitude diminished by a change in the base-emitter voltage ($\Delta V_{BE}$) of the input transistor to which it is applied as a result of an increase in the quiescent emitter current ($\Delta I_e$) portion of the total current flow therethrough (which would otherwise occur when the remaining input transistors are switched off by common emitter action, due to increased conduction in the input transistor associated with this largest amplitude signal) this invention provides compensation to maintain this quiescent portion of the total emitter current through the input transistor associated with the signal of greatest amplitude at its previous level. The operation of the circuit occurs in the following manner. With no input or gating signals present, selection transistors $T_1$ (18) through $T_N$ (24) (N being the number of separate input circuits desired) are all in a quiescent state and, being matched, have equal quiescent emitter currents ($I_e$) therethrough, and transistor switch means 31 is in its normally conducting state. The total quiescent emitter current $I_e$ flowing in transistors $T_1$ through $T_N$ is divided between the fixed current source (composed of resistance 29 and negative potential source 28) and the adjustable current source (composed of source 33, adjustable resistance 32, diode 34 and R-C combination 35 and 36). The amount of this total quiescent emitter current $I_e$ is determined (by an ammeter or other suitable means) and adjustable resistance 32 is then positioned such that the proportion of this total quiescent current ($I_e$) which flows through the switching transistor 31 is $N-1/N$, thus leaving $1/N$ to flow through the fixed current source. Thus it can be seen that during the quiescent period, i.e. with no input signals present, $1/N$ of the total quiescent current flows through each of the input transistors $T_1$ through $T_N$ and that of this total current, $1/N$ flows through the fixed resistance source and $N-1/N$ flows through switching transistor means 31 from the adjustable source controlled by resistance 32.

If positive voltages of varying amplitudes are now applied to one or more of input terminals 5, 6, 7, 8, 9, or 11, the input transistor associated with the signal of greatest amplitude will have the highest conduction level raising its emitter potential above that of the remainder and, through common emitter action, will cut off all other input transistors. This largest input signal then passes through its conducting transistor to output terminal 26.

However, were it not for the action of transistor 31, an explanation of which follows, the signal presented to output terminal 26 would be diminished from its true input amplitude due to a change in the base-emitter voltage ($\Delta V_{BE}$) of its associated input transistor caused by increased current flow therethrough when all other input transistors become cut off. This undesirable reduction in the true amplitude of the selected largest input signal is prevented by applying to input switching terminal 42 a negative potential sufficient to bias transistor 31 to cut-off during any period when one or more input signals are present at input terminals 5, 6, 7, 8, 9, or 11 thereby maintaining the quiescent current portion of the total emitter current flow through the one conducting input transistor at its prior level of $1/N$ of the previous total quiescent emitter current by electrically removing from the circuit the adjustable current source which supplies $N-1/N$ of the total $I_e$ current during the quiescent period. The negative cutoff potential applied to input switching terminal 42 may originate from any suitable source well-known in the art is not considered to be a part of this invention. For example, such a source might take the form of a logical "OR" circuit which would have as inputs thereto, the same positive input signals applied to terminals 5, 6, 7, 8, 9, and 11, and would provide a negative cutoff potential to terminal 42 during any period in which it received one or more positive input signals. With this compensation, the invention will select and provide at output terminal 26, the true amplitude of the largest input signal presented to any of its input selection terminals.

Thus it becomes apparent from the foregoing description and annexed drawing that the invention, a versatile and reliable amplitude sensitive peak selection circuit, is a useful and practical device having many applications in the field of electronics. Obviously many modifications and variations of the present invention are possible in the light of the above teachings. It is therefore to be understood that within the scope of the appended claim, the invention may be practiced otherwise than as specifically described.

I claim:

An amplitude sensitive peak signal selection circuit comprising:

a plurality of input terminal means for receiving input signals of various amplitudes from which the signal of greatest amplitude is to be selected;

a plurality of amplitude sensitive transistor signal selection means each having base, collector, and emitter conduction electrodes, each of said base electrodes being capacitively coupled to one of said input terminal means, respectively, each of said collector electrodes being coupled in common with one another to a source of positive direct current potential, and each of said emitter electrodes being coupled in common with one another;

direct current compensation means including a fixed current source comprising a source of negative direction current potential resistively coupled in common with said emitted electrodes and a gate controlled adjustable current source comprising a single transistor means having base, emitter, and collector electrodes, said base electrode being resistively coupled to ground potential, capacitively coupled to an input terminal for receiving a gate control signal, and coupled via a Zener diode element to a source of direct current potential, said emitter electrode being coupled via an adjustable resistance means to said source of direct current potential, and via diode element and a parallel resistance-capacitance combination to a source of ground potential, and said collector electrode being coupled in common with said emitter electrodes to maintain the direct current flow through the one of said emitter electrodes associated with said input terminal receiving said signal of greatest amplitude, at its quiescent value in order to permit the passage of said signal of greatest amplitude through said transistor signal selection means without changing the true amplitude thereof; and output terminal means being capicitively coupled in common with all of said emitter electrodes of said signal selection means for providing the selected signal of greatest amplitude to a utilization device.

References Cited by the Examiner

UNITED STATES PATENTS

| | | | |
|---|---|---|---|
| 2,783,453 | 2/57 | Rosen | 328—146 |
| 2,964,652 | 12/60 | Yourke | 307—88.5 |
| 2,971,099 | 2/61 | Rosenberg et al. | 307—88.5 |
| 2,987,629 | 6/61 | Germain | 307—88.5 |
| 3,058,007 | 10/62 | Lynch | 307—88.5 |
| 3,092,732 | 6/63 | Milford | 307—88.5 |

ARTHUR GAUSS, *Primary Examiner.*